May 15, 1951 W. A. BRATFISCH 2,553,236
SELF-ALIGNING NUT ASSEMBLY
Filed Dec. 13, 1946
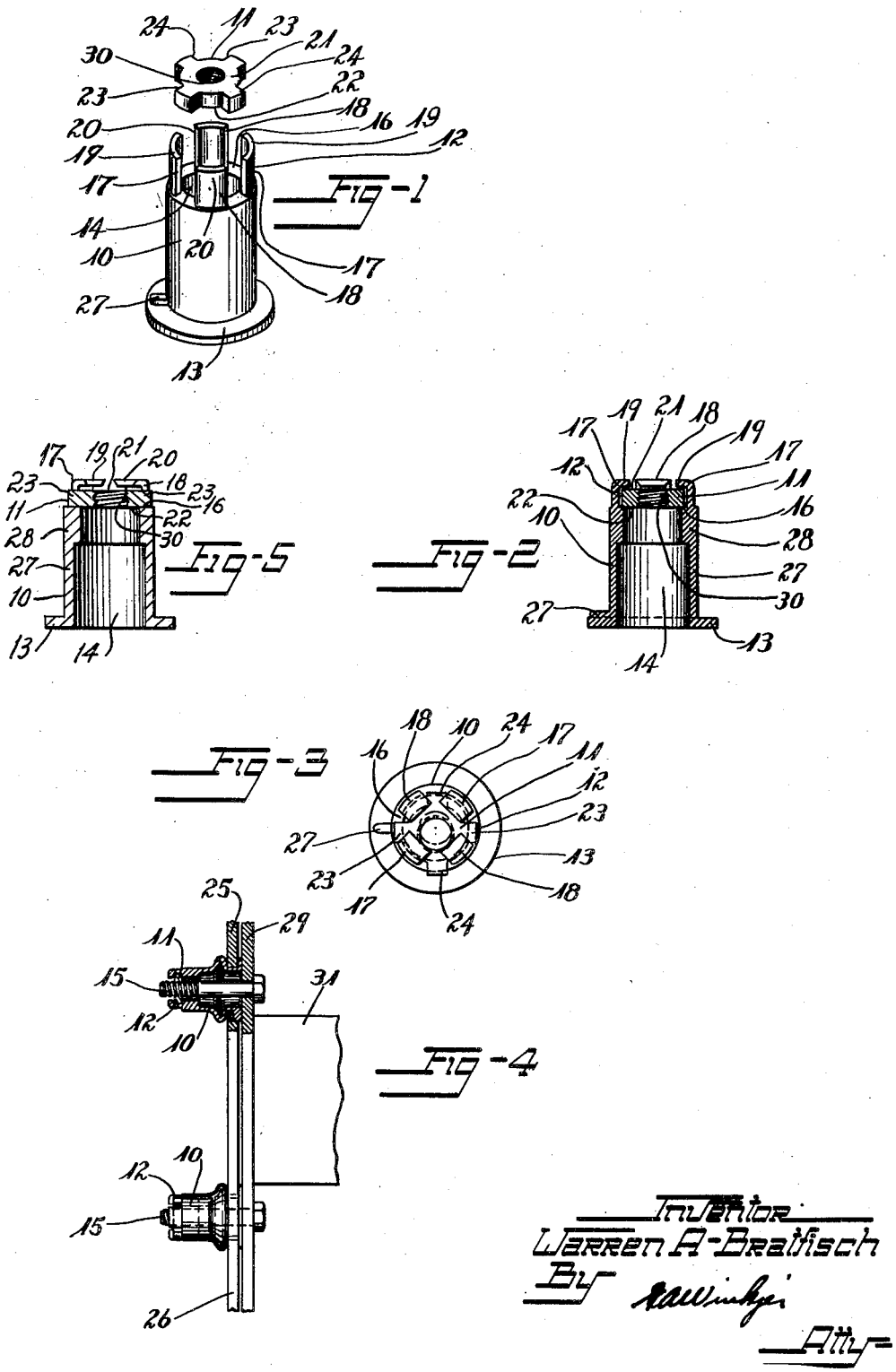
Inventor
Warren A. Bratfisch
By
Atty.

Patented May 15, 1951

2,553,236

UNITED STATES PATENT OFFICE 2,553,236

SELF-ALIGNING NUT ASSEMBLY

Warren A. Bratfisch, Downey, Calif., assignor to
The B. F. Goodrich Company, New York, N. Y.,
a corporation of New York Application December 13, 1946, Serial No. 715,926

5 Claims. (Cl. 85—40)

The invention relates to nut assemblies for fasteners and especially to self-aligning nut and rivet assemblies for facilitating the attachment and detachment of structures despite relative misalignment one with another.

Objects of the invention are to provide an improved nut assembly; to provide for self-alignment thereof; to provide for preventing relative rotation and separation of the respective parts of the assembly while permitting the self-aligning action of the same; to provide a self-aligning nut and rivet assembly; to provide for attaching the nut and rivet assembly to a wall by operations from one side only of the wall; and to provide for simplicity of construction, convenience of manufacture and for effectiveness of operation.

These and other objects and advantages of the invention will be apparent from the following description.

In the accompanying drawings which form a part of this specification and in which like numerals are used to designate like parts throughout the same, Fig. 1 is a perspective view from above of a self-aligning nut and rivet assembly constructed in accordance with and embodying the invention, the parts being shown in separated relation, Fig. 2 is a longitudinal sectional view of the nut and rivet assembly having the parts in assembled relation prior to upsetting of the rivet.

Fig. 3 is a plan view from above of the nut and rivet assembly shown in Fig. 2, the nut being somewhat eccentrically placed as indicated by the broken line showing of the hole when centrally located.

Fig. 4 is a side elevation showing a pair of the nut and rivet assemblies detachably joining structures together, parts being broken away and in section.

Fig. 5 is a sectional view like Fig. 2 taken in a plane through the lateral extensions of the nut.

In the illustrative form of the invention shown in the drawings, the self-aligning nut assembly includes an expansible rivet construction having a tubular body 10 of ductile material, which may be an aluminum alloy, and a nut element 11 of steel or other hard, strong material suitable for the purpose mounted on a nut-supporting portion 12 of the body in intercalated relation with the wall thereof for limited movement laterally with respect to the body. The nut-supporting portion is spaced from an outwardly flanged or seating portion 13 of the body and is located at the end of the body opposite the flanged portion 13. The tubular body 10 has a bore 14 dimensioned to receive a shank member 15 loosely therein, which shank member is threadedly engageable with the nut element 11, as shown especially in Fig. 4.

The nut-supporting portion 12 has an internal shoulder 16 at the face thereof toward the flanged or seating portion 13 against which shoulder the nut element 11 is seated for the engaged condition of the nut with the shank member. For embracing and retaining the nut element in intercalated relation therewith and accommodating the limited lateral movement of the nut element, the nut-supporting portion at the outer periphery of the shoulder may have wall-segments 17, 17, 18, 18 which project axially of the body away from the shoulder and which are circumferentially spaced-apart providing spaces of substantial extent therebetween. In the form shown there are four wall-segments positioned so that the wall-segments of each pair 17, 17 and 18, 18 thereof are diametrically opposite one another. Subsequent to mounting the nut element 11 on the portion 12 adjacent the shoulder 16, the free ends at 19, 19 and 20, 20 of the respective wall-segments may be formed to extend radially inward of the body part way toward one another and in overlying and separated relation to the nut element, as shown especially in Figs. 2 and 3, thus providing a cage arrangement embracing and retaining the nut element while permitting the desired lateral movement of the latter.

The nut element 11 has desirably substantially flat upper and lower faces at 21, 22 for facilitating freedom of lateral movement and assuring continuity of seating against the internal shoulder 16. The nut element 11 may have circumferentially spaced-apart, radially projecting extensions 23, 23 and 24, 24 disposed in the spaces intermediate the wall-segments 17, 17 and 18, 18 in sliding relation to the latter, which extensions also seat against the shoulder 16 for any lateral position of the nut element relative to the tubular body 10. The nut element may have an interiorly threaded bore 30 extending centrally therethrough from face 21 to face 22 for threaded engagement with the shank element 15. The nut element is dimensioned so that it may move laterally and radially of the body 10 within determinate limits, while relative rotation therebetween is prevented by the interlocking action of the wall-segments 17, 17, 18, 18 of the nut-supporting portion and the extensions 23, 23, 24, 24 of the nut element.

For attachment of the nut assembly to the apertured wall 25 of a structure 26 by operations from one side only of the wall i. e. "blind" riveting operations, the tubular body 10 may be elongated in form and have a continuously annular wall intermediate the seating portion and the nut-supporting portion. The annular wall of the body is relatively thin at an expansible portion 27 adjacent the seating portion as compared to the thickness of the wall at the portion 28 adjacent the nut-supporting portion 12 and intermediate the latter portion and the expansible portion, which thinness of the ductile wall material facilitates outwardly expanding the expansible portion to a bulged annular form as shown in Fig. 4, under axially applied pressure at the nut-supporting portion in the direction toward the seating portion.

The expansion of the expansible portion may be accomplished by inserting a threaded shank member of a suitable tool in the bore 14 of the self-aligning nut assembly from the flanged end thereof and engaging the threaded nut element, and then, while the seating portion 13 is bearing against the wall of the structure as shown in Fig. 4, applying the axial pressure toward the flanged end thus drawing the nut-supporting and seating portions toward one another. This action bulges outwardly the thin annular wall of the expansible portion, effectively holding the work or wall 25 of the structure 26 between the seating portion and the bulged expansible portion and fixedly attaching the rivet to the wall 25. The shank member of the tool is then disengaged from the nut element 11 and removed from the bore 14. The seating portion may, if desired, have a key 13a for engaging a suitable slot in the wall of the structure 26 to prevent rotation of the nut and rivet assembly relative to such wall especially during the bulging operation.

A second structure 31 having an apertured wall 29 may be secured to the other structure 26 by one or more threaded shank members 15, 15 extending through one or more apertures in the wall 29 and engaging the threaded nut element 11 of one or more self-aligning nut assemblies. When two or more attachments are provided for joining the structures 26, 31 as shown especially in Fig. 4, the self-aligning nut assembly permits the joinder by virtue of the limited lateral movement of the nut element, even though the apertures in the respective walls 25, 29 are misaligned.

Variation in the spacing of the apertures in the respective walls 25, 29 resulting in misalignment of the apertures is accommodated by the permissible lateral movement in one or more directions of the nut element 11 of either or both of the nut assemblies; since lateral movement of both the shank member 15 and the nut element 11 relative to the tubular body of each nut assembly may occur during the engaging operation, the shank member 15 being loosely disposed in the bore 14 of the tubular body 10.

The construction advantageously provides a self-aligning nut assembly adapted for attachment to a wall by blind riveting operations and capable of accommodating variation in the alignment of attachment apertures of structures to be joined, while having the features of light weight and simplicity of construction.

Variations may be made without departing from the scope of the invention as it is defined in the following claims.

I claim:

1. A self-aligning nut and rivet assembly comprising an elongated tubular body having a continuous annular wall defining a bore to receive a threaded shank member loosely therein, a flanged seating portion at one end of said body, a nut-supporting portion at the other end of said body, an outwardly expansible portion between said seating portion and said nut-supporting portion having a wall radially thinner than that of said nut-supporting portion, and a nut element mounted on said nut-supporting portion, said nut-supporting portion comprising a shoulder for seating said nut element, and circumferentially spaced-apart wall-segments projecting axially of the body away from said shoulder and extending radially inward at the free ends thereof to embrace and retain said nut element while permitting limited lateral movement of the same, said nut element having circumferentially spaced-apart extensions disposed in the spaces intermediate said wall-segments in laterally slidable relation to the latter, said expansible portion providing an outwardly bulged continuous annular portion of said body under axial pressure toward said seating portion and applied at said nut-supporting portion by the threaded shank member of a tool inserted in said bore from the flanged end of said body and threadedly engaging said nut element.

2. A self-aligning nut and rivet assembly adapted to be inserted and upset in a work aperture by operation from one side only of the work, said assembly comprising a tubular rivet having a head end and an annular body extending from said head end to the other end of the assembly of a maximum outside diameter such as to be insertable in the work aperture for the full length of said body, said body comprising a portion outwardly expansible by upsetting forces directed in the axial direction of the inserted rivet for seating against the work, the expansible portion merging into an end portion of said body having ports in the wall thereof providing nut-seating faces entirely within said maximum outside diameter, and a nut accommodated in said end portion of said body within said maximum outside diameter having portions bearing on said faces in laterally movable relation thereon for permitting lateral shifting of said nut relative to said body.

3. A self-aligning nut and rivet assembly adapted to be inserted and upset in a work aperture by operation from one side only of the work, said assembly comprising a tubular rivet having a head at one end thereof and an annular body extending from said head to the other end of the assembly of a maximum outside diameter such as to be insertable in the work aperture for the full length of said body, said body comprising a continuously annular portion outwardly expansible by upsetting forces directed in the axial direction of the inserted rivet for seating against the work, the expansible portion merging into an end portion of said body having ports in the wall thereof providing nut-seating faces entirely within said maximum outside diameter, and a nut accommodated in said end portion of said body within said maximum outside diameter having portions bearing on said faces in laterally movable relation thereon for permitting lateral shifting of said nut relative to said body.

4. A self-aligning nut and rivet assembly adapted to be inserted and upset in a work aperture by operation from one side only of the work, said assembly comprising a tubular rivet having a head end and an annular body extending from said head end to the other end of the assembly of a maximum outside diameter such as to be insertable in the work aperture for the full length of said body, said body comprising a continuously annular portion outwardly expansible by upsetting forces directed in the axial direction of the inserted rivet for seating against the work, the expansible portion merging into an end portion of said body having ports extending laterally through the wall thereof providing nut-seating faces entirely within said maximum outside diameter, and a nut in said end portion of said body having extensions accommodated within said maximum outside diameter and projecting into said ports and bearing on said faces in laterally movable relation thereon for movement in and through said ports to permit lateral shifting of said nut relative to said body.

5. A self-aligning nut and rivet assembly adapted to be inserted and upset in a work aperture by operation from one side only of the work, said assembly comprising a tubular rivet having a head end and an annular body extending from said head end to the other end of the assembly of a maximum outside diameter such as to be insertable in the work aperture for the full length of said body, said body comprising a continuously annular portion outwardly expansible by upsetting forces directed in the axial direction of the inserted rivet for seating against the work, the expansible portion merging into an end portion of said body, a nut in said end portion of said body, said end portion having a castellated form providing circumferentially spaced-apart wall-segments extending in the direction axially away from said expansible portion with end flanges disposed radially inward over said nut for retaining the same in said end portion, and said body comprising nut-seating faces in the spaces between said wall-segments entirely within said maximum outside diameter of said body, said nut having extensions accommodated within said maximum outside diameter and projecting into said spaces and bearing on said faces in laterally movable relation thereon for movement in and through said spaces to permit lateral shifting of said nut relative to said body.

WARREN A. BRATFISCH.

REFERENCES CITED

The following references are of record in the file of this patent:

UNITED STATES PATENTS

| Number | Name | Date |
|---|---|---|
| 1,183,556 | Green | May 16, 1916 |
| 1,711,453 | Carr | Apr. 30, 1929 |
| 2,017,421 | Post | Oct. 15, 1935 |
| 2,078,411 | Richardson | Apr. 27, 1937 |
| 2,154,494 | Corlett | Apr. 18, 1939 |
| 2,361,979 | Tarwater | Nov. 7, 1944 |
| 2,385,893 | Taylor | Oct. 2, 1945 |
| 2,392,133 | Eklund | Jan. 1, 1946 |